United States Patent [19]

Berkey

[11] Patent Number: 4,931,076
[45] Date of Patent: Jun. 5, 1990

[54] METHOD OF MAKING FIBER OPTIC COUPLER

[75] Inventor: George E. Berkey, Pine City, N.Y.
[73] Assignee: Corning Incorporated, Corning, N.Y.
[21] Appl. No.: 204,620
[22] Filed: Jun. 9, 1988

Related U.S. Application Data

[63] Continuation-in-part of Ser. No. 82,678, Aug. 7, 1987, abandoned.

[51] Int. Cl.⁵ .............................................. C03B 37/10
[52] U.S. Cl. ...................................... 65/4.2; 65/110; 65/4.21; 65/4.3; 350/96.15
[58] Field of Search ................. 65/3.11, 3.2, 4.2, 4.21, 65/4.3, 109, 110; 350/96.15

[56] References Cited

U.S. PATENT DOCUMENTS

| | | | |
|---|---|---|---|
| 3,579,316 | 5/1971 | Dyott et al. | 65/4.21 |
| 4,291,940 | 6/1977 | Kawasaki et al. | 65/4.2 |
| 4,377,403 | 3/1983 | McLandrich | 65/3.11 |
| 4,392,712 | 7/1983 | Ozeki | 350/96.15 |
| 4,410,346 | 10/1983 | Aulich et al. | 65/4.2 |
| 4,426,215 | 1/1984 | Murphy | 65/4.21 |
| 4,439,221 | 3/1984 | Smyth et al. | 65/4.21 |
| 4,449,781 | 5/1984 | Lightstone et al. | 350/96.16 |
| 4,490,163 | 12/1984 | Jochem et al. | 65/4.2 |
| 4,591,372 | 5/1986 | Bricheno et al. | 65/4.2 |
| 4,726,643 | 2/1988 | Imoto et al. | 350/96.21 |

FOREIGN PATENT DOCUMENTS

| | | | |
|---|---|---|---|
| 59-195615 | 11/1984 | Japan | 65/3.11 |
| 60-140208 | 7/1985 | Japan . | |

OTHER PUBLICATIONS

Dyott et al., Polarization Holding Directional Couplers using D fiber Society of Photo-Optical Instrumentation Engineers, vol. 479, 1984, pp. 23–27.

Primary Examiner—Kenneth M. Schor
Assistant Examiner—John J. Bruckner
Attorney, Agent, or Firm—William J. Simmons, Jr.

[57] ABSTRACT

A method of making an economical fiber coupler comprises providing a glass tube having first and second end portions and a midregion, and a longitudinal aperture extending therethrough. Two suitably prepared glass optical fibers, each having a core and cladding, are disposed within the longitudinal aperture, the fibers extending beyond each end thereof. The fibers are held taut to effect a tension therein, and they are glued to each end portion. The midregion of the member is heated, collapsed about the fibers, and drawn to reduce the diameter thereof.

16 Claims, 4 Drawing Sheets

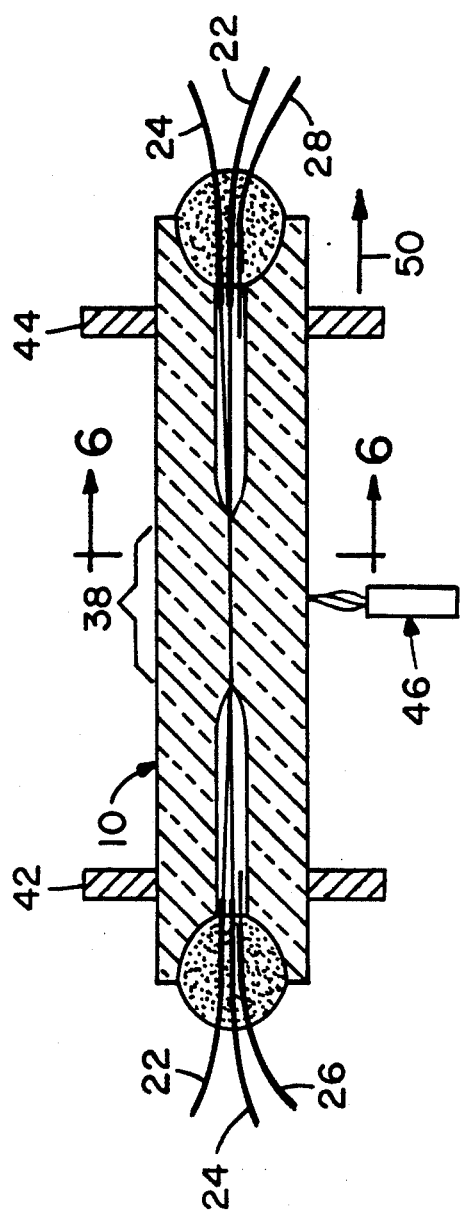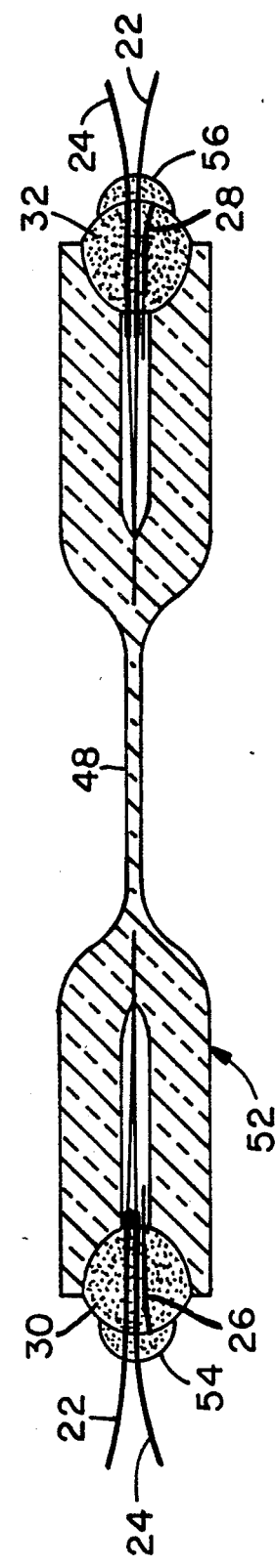

4,931,076

METHOD OF MAKING FIBER OPTIC COUPLER

CROSS-REFERENCE TO RELATED APPLICATION

This application is a continuation in part of U.S. patent application Ser. No. 82,678 filed Aug. 7, 1987 now abandoned and is related to U.S. patent application Ser. No. 765,652 entitled "Method of making Low Loss Fiber Optic Coupler" by D. B. Keck et al., filed Aug. 15, 1985 now U.S. Pat. No. 4,799,949 and is related to U.S. patent application Ser. No. 380,877 by Berkey, filed Jul. 17, 1989 and is related to U.S. patent application Ser. No. 223,423 by Miller, filed Jul. 25, 1988 now U.S. Pat. No. 4,902,324 and is related to U.S. patent application Ser. No. 366,658 by Berkey, filed June 15, 1989.

BACKGROUND OF THE INVENTION

Certain types of fiber optic systems require couplers in which at least a portion of the light propagating in an optical fiber is coupled to one or more output fibers. The present invention relates to such fiber optic couplers and more particularly to a cost effective and reproducible method of making such fiber optic couplers.

It has been known that coupling occurs between two closely spaced cores in a multiple core device. The coupling efficiency increases with decreasing core separation and, in the case of single-mode cores, with decreasing core diameter. A number of couplers that are based on these principles have been developed. Such couplers are capable of low loss operation; they typically exhibit an excess loss of about 1 dB or less.

Multimode and single-mode couplers have been formed by positioning a plurality of fibers in a side-by-side relationship along a suitable length thereof and fusing the claddings together to secure the fibers and reduce the spacings between the cores. Coupling can be enhanced by stretching and by rotating the fibers along the fused length thereof as taught in U.S. Pat. No. 4,426,215 to Murphy; however, rotating the fibers is disadvantageous for certain purposes. Also, a portion of the cladding is sometimes removed by etching or grinding to decrease the intercore distance as taught in U.S. Pat. No. 4,449,781 to Lightstone et al. Since the coupling region is fragile and is exposed to the atmosphere, such couplers must then be provided with a hermetic enclosure. These processes are labor intensive and therefore expensive, they may lack long term integrety, and do not always result in couplers exhibiting predetermined desired coupling characteristics. Such disadvantages are particularly apparent in the manufacture of certain single-mode couplers wherein the coupling core sections are to remain parallel to each other to insure that the propagation constants are matched and of certain single-mode couplers which must possess optical characteristics such as polarization retention.

Although most couplers are made by applying heat directly to the fibers to be joined, U.S. Pat. No. 3,579,316 to Dyott et al. teaches a method wherein the fibers are first inserted into a capillary tube where the ends may overlap. The capillary tube is formed of a glass having a refractive index lower than that of the fiber cladding material. Heat is applied to the capillary tube in the vicinity of the fiber overlap and the tube is stretched until the diameter thereof approximates that of the original fibers. The original cores of the pulled out part become vanishingly small, their stretched diameters being only about 1/100 the original diameters; the cladding of the original fibers becomes the core of the coupling section. Such a long thin coupler is very cumbersome and fragile. Furthermore, such a coupler is lossy since the original cladding takes the place of the vanished cores. In the region of the coupler where the fiber cores taper from their "vanishingly small" size to their full size, an insufficient amount of power is transferred from the cladding back to the core. Moreover, it is difficult to maintain the cores straight and parallel to one another when fibers are inserted into a tube which is then stretched unless specific steps are taken to position the fibers. Such non-linear coupler cores can lead to decreased coupling efficiency in single-mode couplers.

Japanese published application 60-140208 teaches a coupler formed by pre-twisting a pair of fibers, inserting them into a quartz tube, and heating and drawing the central part of the tube to reduce its diameter. Resin is then applied to the ends of the tube to seal the fibers thereto. This coupler has the following disadvantages. During the collapse of the tube onto the fibers, the capillary tube is not evacuated and the fibers are not held taut. The fibers therefore meander in the tube, thereby preventing the achievement of a predetermined coupling when the tube is elongated by a predetermined length. This also makes it difficult to achieve low coupler loss. The fibers are pre-twisted in order to provide a sufficient length of fiber-to-fiber contact to provide adequate coupling. Such a coupler cannot maintain the polarization of an input optical signal; moreover, it is difficult to make wavelength division multiplexed couplers with twisted fibers.

SUMMARY OF THE INVENTION

It is, therefore, an object of the present invention to provide a method that overcomes the disadvantages of the prior art. Another object is to provide a method of making low cost, high optical quality optical couplers. A further object is to provide a method of making optical couplers that are capable of withstanding environmental abuses such as temperature changes and mechanical influences and yet effect a reliable and predictable transfer of energy between adjacent fibers. Yet another object is to provide a low cost, efficient optical fiber coupler to which fibers may be easily connected in the field as well as in the shop. A further object is to provide an automated method of making optical couplers, the optical properties of which closely conform to predetermined values. Yet another object is to provide a mechanically strong, inexpensive optical coupler that is capable of effecting a reliable and predictable transfer of energy between adjacent fibers.

In accordance with the method of the present invention there is provided a glass tube having first and second opposite end portions and a midregion, a longitudinal aperture extending from a first end of the tube to a second end thereof. At least two suitably prepared glass optical fibers, each having a core and cladding, are disposed within the longitudinal aperture in a manner such that they extend beyond each of the ends of the tube. If the glass fibers have a coating thereon, a portion of the coating intermediate the ends thereof is removed, the uncoated portion of said glass fibers being disposed within the longitudinal aperture of the tube. The fibers are held taut to effect a tension therein.

The inside of the assembly so formed may be cleaned by applying a vacuum to one end thereof and flowing through the aperture a suitable fluid such as air or a cleaning solution. The midregion of the assembly so formed is heated to cause it to collapse around the fibers, and it is drawn down to a predetermined diameter. Collapse of the central portion the tube can be facilitated by creating a lower pressure within the aperture than at the outer surface thereof prior to the step of heating the tube.

The fact that the fibers are held taut during the collapse step is a primary reason for the low device losses achieved by couplers made in accordance with the method of the present invention. The fibers may be held taut during the collapse step by affixing each of them to the first end portion of the tube, pulling that portion of the fibers that extend from the aperture at the second end of the tube to apply a tension to the fibers, and affixing each of the fibers to the second end portion of the tube. The fibers can be affixed to the end portions of the tube by applying glue to the fibers to seal them to the first and second end portions of the tube. The step of applying glue to at least one of the end portions of the tube may comprise applying glue to less than the entire circumfirential region around the fibers, thereby leaving an opening between the aperture and the glue, whereby an access is retained at that end of the tube to the aperture. The application of glue to the fibers in such a manner that the aperture is not blocked thereby is facilitated by utilizing a capillary tube having enlarged, tapered apertures at the ends thereof.

Although low loss couplers have been made by collapsing the tube onto the fibers and drawing or stretching the midregion of the tube in a single heating operation, it is advantageous to separately perform these steps. If the tube is allowed to cool prior to heating it for the stretching operation, more control can be exerted over each step. A central portion of the solid collapsed midregion can be stretched, thereby keeping the stretched portions of the optical fibers completely enclosed in the matrix glass of the tube. This improved hermeticity is advantageous since it prevents the stretched portions of the fibers from being adversely affected by water and the like, a factor that can adversely modify the optical characteristics of the coupler.

Access to the aperture for cleaning or evacuating purposes may be obtained by disposing a hollow filament within the end portion of the tube contiguous to the two glass fibers before the glue is applied. After the steps of collapsing and drawing the central region of the tube, the extending hollow filaments are removed and the resulting apertures or holes sealed.

BRIEF DESCRIPTION OF THE DRAWING

FIG. 5 is a cross-sectional view illustrating the collapse of the glass tube around the fibers to form a solid midregion.

FIG. 6 is a cross-sectional view through the solid midregion of FIG. 5 along lines 6—6.

FIG. 7 is a cross-sectional illustration of the fiber coupler of the present invention after it has been drawn down and sealed at its ends.

DESCRIPTION OF THE PREFERRED EMBODIMENTS

The drawings are not intended to indicate scale or relative proportions of the elements shown therein.

Figure 1:
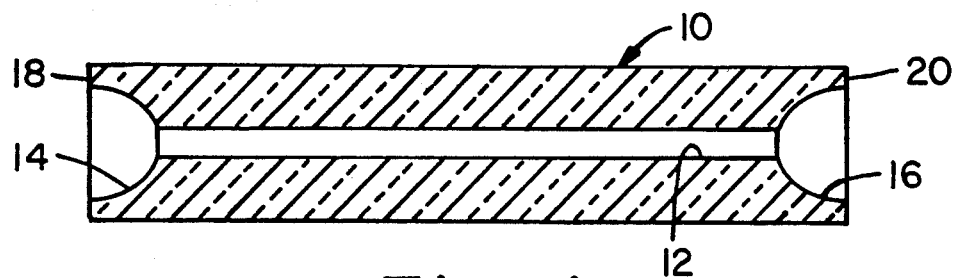
FIG. 1 is a cross-sectional view of a glass tube suitable for the purposes of the present invention.

Referring to FIG. 1, there is provided a hollow glass cylindrical tube 10 having a longitudinal aperture or bore 12 provided along the longitudinal axis thereof. Tube 10 may comprise a capillary tube which may be formed as hereinafter described in detail or as taught in my copending application entitled "Capillary Splice and Method", Ser. No. 082,680 (Berkey 9), filed on Aug. 7, 1987, which application is incorporated herein by reference. Tapered apertures 14 and 16 form funnel-like entrances to longitudinal aperture 12 at end surfaces 18 and 20, respectively. The tapered apertures facilitate the insertion of fibers into aperture 12, since the maximum cross-sectional dimension thereof may be less than 400 $\mu$m.

The softening point temperature of tube 10 should be lower than that of the fibers that are to be inserted therein. Suitable tube compositions are $SiO_2$ doped with 1 to 25 wt. % $B_2O_3$ and $SiO_2$ doped with 0.1 to approximately 2.5 wt. % fluorine. A preferred composition is borosilicate glass comprising $SiO_2$ doped with 8-10 wt. % $B_2O_3$. In addition to lowering the softening point temperature of $SiO_2$, $B_2O_3$ and F also advantageously decrease the refractive index thereof.

Figure 2:
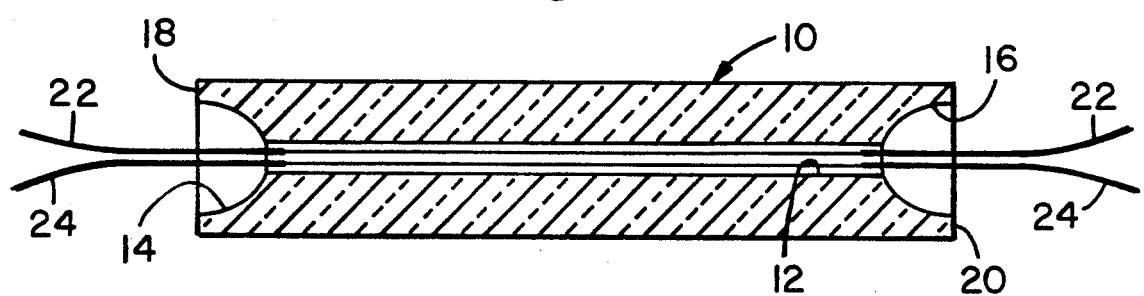
FIG. 2 is a cross-sectional view of the tube of FIG. 1 within which a pair of optical fibers are disposed.
Figure 2A:
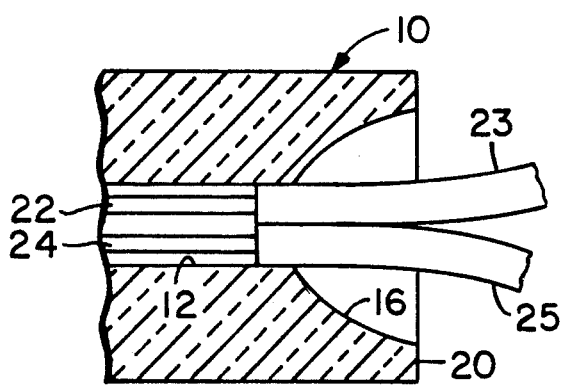
FIG. 2a is a cross-sectional view of one end portion of the tube of FIG. 2.

Referring to FIG. 2, a pair of optical fibers 22 and 24, each having a core, cladding, and protective coating, extend through longitudinal aperture 12, a sufficient length of each fiber extending beyond each end of tube 10 to make connection thereto, a length of 1 meter having been found to be sufficient. A portion of the coating intermediate the ends of each fiber is removed for a distance slightly shorter than the length of aperture 12. The fibers are wiped to eliminate residual material. The uncoated portions of the fibers are disposed intermediate end surfaces 18 and 20 of hollow member 10. Preferably, the uncoated portions of fibers 22 and 24 are longitudinally centered within aperture 12. For convenience and ease of illustration, fibers 22 and 24 are drawn in the figures with a light line within most of aperture 12 and a heavy line from within the ends of aperture 12 to the exterior of tube 10. The light lines represent uncoated portions of the fibers while the heavy lines represent coated portions thereof. FIG. 2a is an enlarged cross-sectional view of one end of FIG. 2 showing coatings 23 and 25 on optical fibers 22 and 24 respectively.

Figure 3:
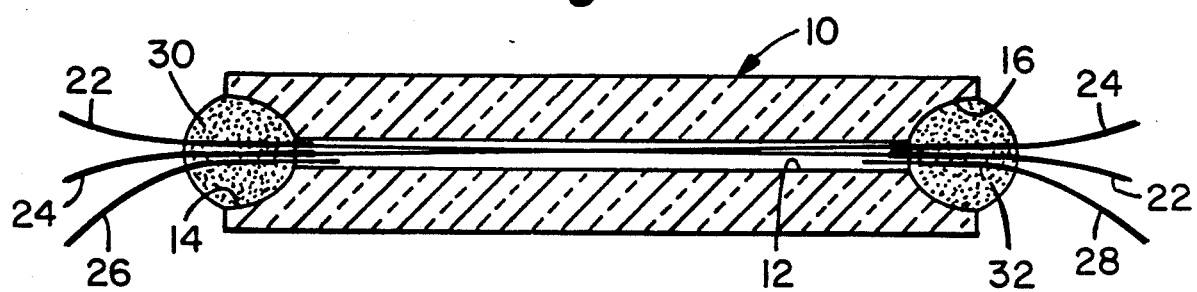
FIG. 3 is a cross-sectional view illustrating further steps in the method of the present invention.

The fibers may be maintained parallel to one another within aperture 12 or may be twisted any amount including 180° or more as illustrated in FIG. 3. Twisting the fibers is a well known technique that has been used to maintain the fibers in mutual contact during the step of fusing the fibers together. If vacuum is employed during collapse of tube 10 as herein described, twisting of the fibers is not critical since the vacuum will assist collapsing the tube and maintaining the fibers in longitudinal contact with each other. It is noted that for certain types of coupling devices, such as WDM couplers and polarization retaining couplers, the fibers must be kept untwisted and must be maintained parallel to one another.

The assembly comprising tube 10 and the fibers extending therethrough is preferably subjected to a final cleaning step prior to collapsing tube 10 and fusing together the stripped fiber portions. This step is important since small pieces of coating material or other contaminants may remain on the uncoated portions of the fibers after they have been inserted into tube 10. The cleaning step may comprise flowing a cleaning fluid through aperture 12 and over the stripped portions of fibers 22 and 24. The cleaning fluid may comprise a liquid cleaning solution such as a 30% ammonia solution or a gas such as air. Furthermore, the fibers are preferably held taut during the tube collapse step. A variety of techniques can be employed to effect the steps of cleaning the aperture and tensioning the fibers; preferred techniques being described in the following specific embodiments.

In a first embodiment, a pair of optical fibers 22 and 24, each having a core, cladding, and protective coating, are suitably prepared by removing a portion of the coating intermediate the ends thereof as described above. The uncoated section is cleaned by wiping with a lintless cloth to remove residual material. Fibers 22 and 24 are fed through longitudinal aperture 12 so that a suitable length extends beyond each end of tube 10 for connection purposes. The uncoated portions of the fibers are disposed intermediate end surfaces 18 and 20 of hollow member 10 as shown in FIG. 2, the uncoated portion of fibers 22 and 24 preferably being centered within aperture 12.

For certain types of couplers, fibers 22 and 24 may then be twisted within longitudinal aperture 12 about 180° as illustrated in FIG. 3. A hollow glass filament 26 is inserted into the end portion of tube 10 so that it extends a short distance into longitudinal aperture 12. Fibers 22 and 24 and filament 26 are then secured to the end portion of member 10 by applying a quantity of glue 30 within and about tapered aperture 14. The process is then repeated at the other end of member 10 by inserting a second hollow glass filament 28 into longitudinal aperture 12 and applying a quantity of glue 32 to the fibers within and about aperture 16. While glue 32 is setting or curing, a slight tension is applied to fibers 22 and 24. Glue 30 and 32 may consist of any bonding material such as cement, adhesive or the like, UV curable epoxy being preferred.

The assembly so formed is then placed in a suitable mounting device or holder 34, such as a tinners clamp. Hollow filament 28 may then be connected to a suitable source of vacuum (not shown) illustrated by arrow 36. Alternatively, a tube connected to a source of vacuum may be placed around the end of capillary tube 10 so that hollow filament 28 and fibers 22 and 24 extend into the evacuated tube. If hollow filament 26 is inserted into a liquid cleaning fluid, the fluid is drawn through longitudinal aperture 12 by the vacuum applied to hollow filament 28 whereby it cleans the interior of longitudinal aperture 12 and those portions of fibers 22 and 24 and hollow filaments 26 and 28 that are disposed therein.

Figure 4:
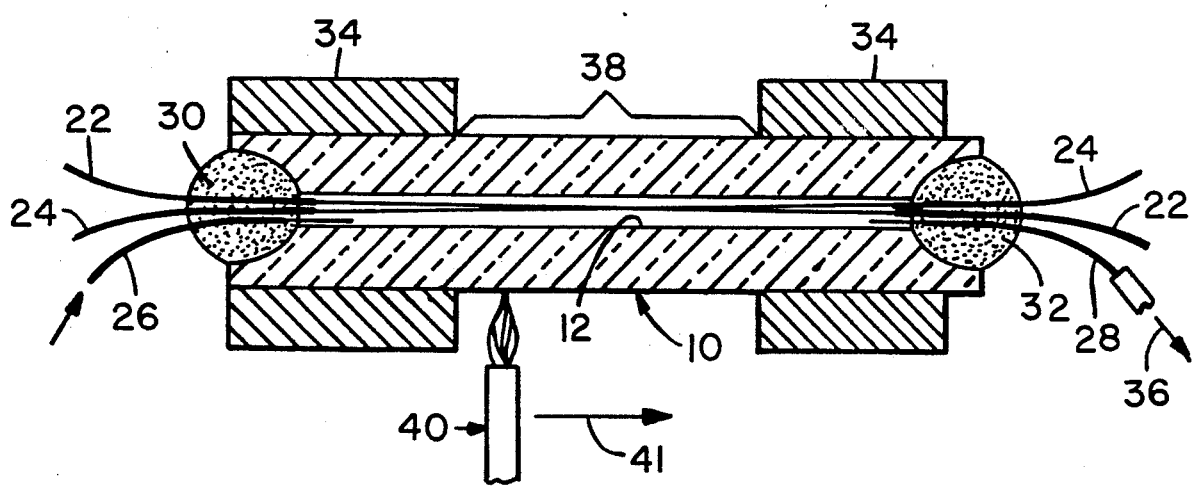
FIG. 4 is a cross-sectional view illustrating additional steps in the process of the present invention.

If a liquid cleaning fluid is employed, midregion 38 of the assembly so formed is then heated by a suitable heat source 40 as illustrated in FIG. 4, to vaporize the liquid and dry out the assembly. This drying step is not needed if a gas is used as the cleaning fluid.

In accordance with one embodiment of the present invention, tube 10 is heated and collapsed onto fibers 22 and 24, and thereafter, the midregion of tube 10 is heated and stretched to bring the fiber cores closer together along a distance sufficient to accomplish a predetermined type of coupling. This is accomplished by first heating midregion 38 to the softening point of the borosilicate glass tube 10 by means of heat source 40, which may comprise an oxygen-hydrogen burner, a gas-oxygen burner, or the like. Burner 40 may remain stationary or it may traverse midregion 38 in the direction toward vacuum source 36 as shown by arrow 41 in FIG. 4. It is an optional feature of the tube collapse step to apply a vacuum source to both hollow filaments 26 and 28, in which case the direction of burner traverse is immaterial. The step of subjecting midregion 38 to heat source 40 causes the material of tube 10 at midregion 38 to collapse about fibers 22 and 24 as additionally illustrated in FIG. 5. FIG. 6 illustrates the collapsed midregion 38 of tube 10 about fibers 22 and 24 along line 6—6 of FIG. 5. The portion described as midregion 38 becomes a solid region that is preferably free of air lines, bubbles, or the like.

The assembly so formed is removed from holder 34 and placed in a precision glass working lathe illustrated by members 42 and 44 in FIG. 5. The solid midregion 38 is then subjected to the flame from an oxygen-hydrogen burner 46 until a portion of the solid midregion 38 is heated to the softening point thereof. If the entire midregion were stretched, the end portion of the light coupling region of the fibers could be exposed to the aperture. Stretching only the central portion of the collapsed midregion ensures that the coupling region of the fibers will be embedded in the matrix glass of the capillary tube. The flame is removed and the softened portion of midregion 38 is pulled or drawn down by action of the glass working lathe to reduce the diameter thereof as illustrated by region 48 of FIG. 7. The diameter of drawn down region 48 will vary as a function of various fiber and operational parameters. The ratio of the drawn down diameter of region 48 to the starting diameter of midregion 38 (the draw down ratio) is determined by the optical characteristics of the particular device being made. It is well known that such draw down ratios are a function of the ratio of the signal split between the fibers, the refractive index difference between the tube and the fiber cladding, the outside diameter of the fiber cladding, the diameter of the fiber core, signal operating wavelength, cutoff wavelength, the tolerable excess loss, and the like. A preferred range of draw down ratios is between about ½ to 1/20; however, couplers can be made having draw down ratios outside this range.

As illustrated in FIG. 5, the portion of member 10 held by glass working lathe member 42 is held stationary while the portion of member 10 held by lathe member 44 is traversed in the direction of arrow 50 to obtain drawn down region 48. In practice, such a pull down or draw down takes approximately ½ second. Alternative drawing techniques involve the movement of lathe member 42 in the same direction as that in which member 44 moves or in a direction opposite that in which member 44 moves.

The assembly would not need to be rotated if the draw down portion of midregion 38 were heated by a ring burner which would uniformly heat that region around its periphery. The draw down method would otherwise be the same. In the embodiment wherein a ring burner is employed, the step of collapsing tube 10 onto fibers 22 and 24 and the step of forming drawn down region 48 may be performed on the same apparatus. If the collapse and stretch operations are performed in the same apparatus, it is preferred that tube 10 be allowed to cool prior to being reheated for the stretch step. This temporal separation of the two steps results in better process control and therefore better reproducibility. Furthermore, tube 10 can be disposed in any orientation including vertical and horizontal during the tube collapse and/or drawing operations.

After the draw down, the exposed ends of hollow filaments 26 and 28 are removed by breaking them off at the surface of glue 30 and 32, and the apertured ends thereof are sealed with quantities 54 and 56 of glue as heretofore described. The resulting assembly comprises fiber optic coupler 52 of FIG. 7. The coupler can be further processed by packaging, not shown, for additional stiffness if desired. Coupler 52 functions to couple a signal in optical fiber 22 to optical fiber 24 and vice versa.

In accordance with the above-described embodiment, the steps of collapsing and stretching are separately performed. This is advantageous since more control can be exerted over each step if the tube is allowed to cool prior to heating it for the stretching operation. A central portion of the solid collapsed midregion can be stretched, thereby keeping the stretched portions of the optical fibers completely enclosed in the matrix glass of the tube. This improved hermeticity is advantageous since it prevents the stretched portions of the fibers from being adversely affected by water and the like, a factor that can adversely modify the optical characteristics of the coupler.

Low loss couplers have also been made by an alternative embodiment wherein the steps of collapsing the tube onto the fibers and drawing or stretching the midregion of the tube are performed in a single heating operation. In accordance with this modified embodiment, the fibers are inserted into the capillary tube and are glued taut to the ends thereof such that there are access openings to the aperture. This assembly is placed in a precision glass working lathe as described above. A flame is applied to a small portion of the midregion until the softening point of the materials is reached, and the heated section is stretched. For a given amount of coupling, the amount of tube elongation is greater in this embodiment than in that embodiment wherein the tube collapse and the medregion stretching steps are separately performed. Finally, glue is applied to the ends of the device to close the openings to the aperture.

The disadvantages of this embodiment are a reduction in hermeticity and an adverse affect on manufacturing reproducibility, i.e. stretching to a predetermined length does not always result in the desired coupling characteristics. However, this embodiment has some advantages over other methods. The method is simpler in that it can be performed without vacuum and the separate tube collapse step is eliminated. Low loss couplers have been formed by this method, device losses as low as 0.05 dB 1300 μm having been measured.

In another alternative embodiment a hollow fiber is employed in only one end of tube 10. Such an embodiment is similar to that resulting in the formation of coupler 52 except that the internal cleansing step described will not be practical.

Figure 8:
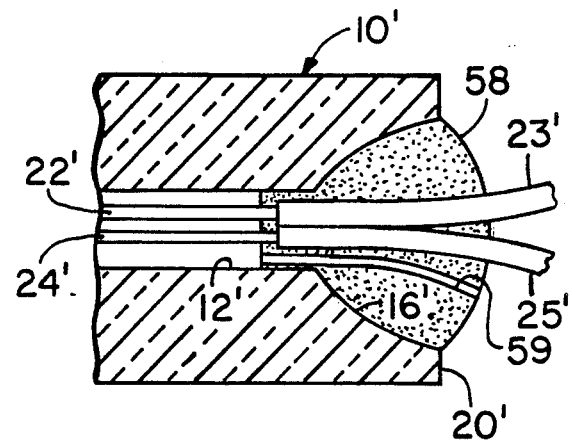
FIGS. 8 and 9 are cross-sectional views illustrating additional methods of providing access to the tube aperture during processing.
Figure 9:
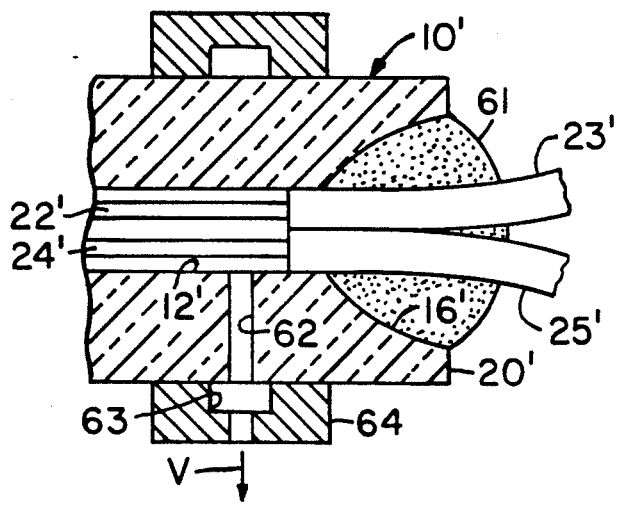
Figure 10:
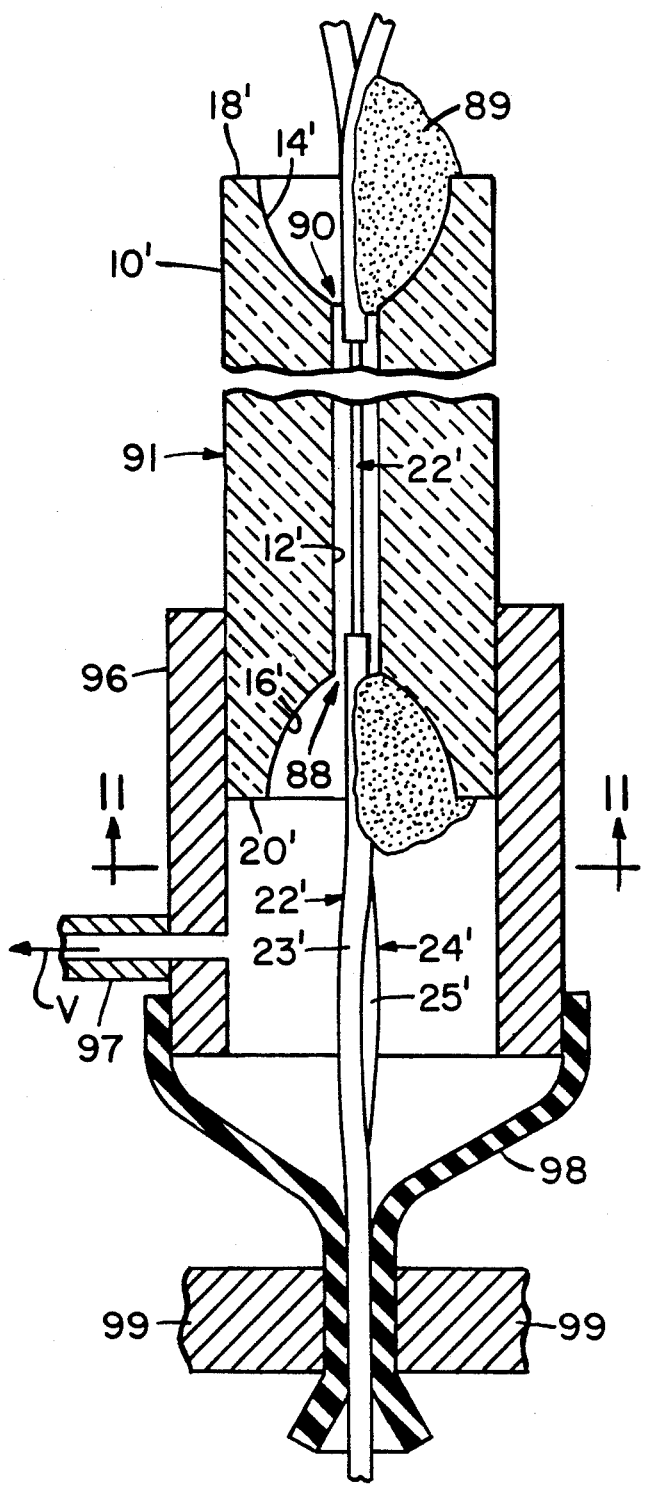
FIG. 10 is a cross-sectional view illustrating an additional method of providing access to the tube aperture, and in addition, illustrates a method of evacuating the tube.

The hollow fibers are eliminated entirely in the embodiments of FIGS. 8 through 10, wherein elements similar to those of FIG. 2 are represented by primed reference numerals.

The initial steps needed to form the embodiment of FIG. 8 are the same as those employed to form that of FIG. 3. A filament similar to filament 28, which may be hollow or solid, is inserted through tapered aperture 16' so that it protrudes a short distance into aperture 12' as shown in FIG. 3. After the uncoated portions of fibers 22' and 24' have been centered in aperture 12', a quantity of glue 58 is applied within and about tapered aperture 16'. As shown in this figure, the glue advantageously extends into aperture 12' a sufficient distance to contact the glass cladding of fibers 22' and 24'. As glue 58 begins to set or cure, its viscosity becomes sufficiently high so that removal of the extra filament will leave an aperture 59 into which bonding material 58 cannot flow and close. An aperture similar to aperture 59 could also be formed in the glue located at the opposite end of tube 10'. To clean and/or evacuate aperture 12', a vacuum attachment tube may be placed around the pheriphery of tube 10' at end surface 20' thereof as described above.

In the embodiment of FIG. 9 glue 61 completely seals tapered aperture 16'. A radial bore 62 near the end 20' of tube 10' provides access to aperture 12' for cleaning/or evacuating purposes. Aperture 12' can be evacuated through bore 62 by attaching an annular vacuum fixture 64 to tube 10' so that bore 62 opens into annular slot 63. Arrow V indicates that a vacuum source is connected to fixture 64. A radial bore similar to bore 62 can be formed at the opposite end of tube 10' for purposes such as supplying cleaning fluid or gas to aperture 12' and/or evacuating aperture 12'.

Figure 11:
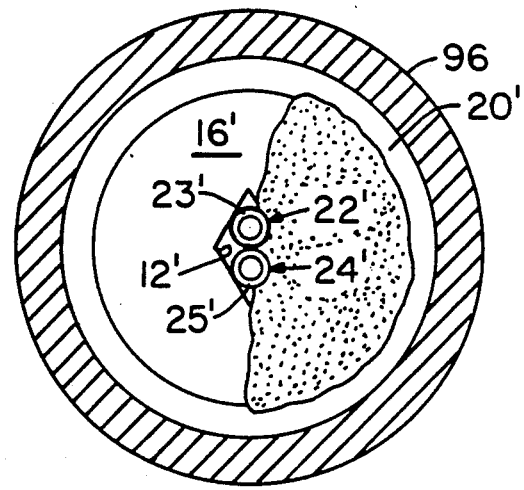
FIG. 11 is a cross-sectional view taken along lines 11—11 of FIG. 10.

For a coupler manufacturing process to consistently produce couplers having predetermined optical characteristics, all of the process steps, including the step of inserting the fibers into the capillary tube should be uniformly performed on each coupler made. Discussed along with a description of the method of forming the embodiment of FIGS. 10 and 11 is a preferred fiber insertion method which enhances process uniformity. It is advantageous to employ a fiber insertion station which meets the following criterion. The mechanism which is to hold the fibers should be properly aligned since the fibers are preferably kept untwisted and straight. Means should be provided for holding the fibers under a slight tension during the gluing step to eliminate the occurrence of fiber slack or sag during further processing steps, especially during the step of collapsing the capillary tube onto the fibers. The appearance of slack in one or both of the fibers could cause the resultant device to exhibit an excessive loss. The area around the station should be free from excessive dust and other particulates that could be drawn into the capillary tube and lodged inside, since seeds could result from such particulate matter during the collapse and redraw steps. The excessive attenuation that can result from such seeds could render the coupler useless.

Figure 12:
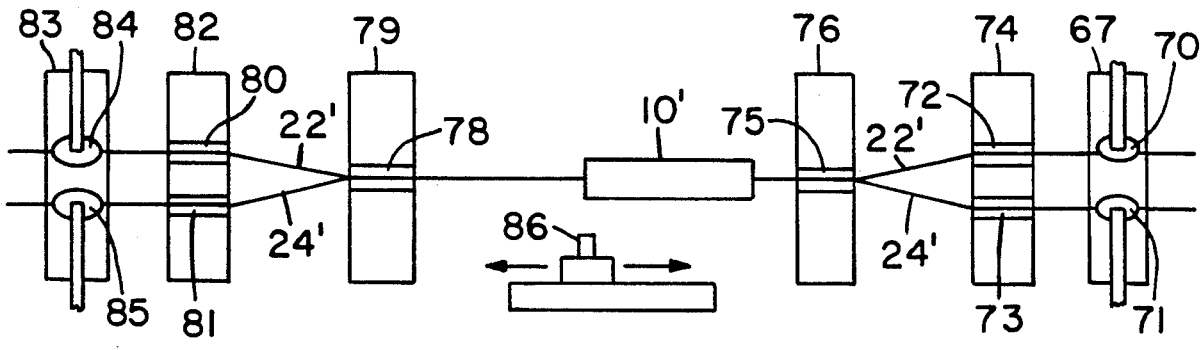
FIG. 12 is a schematic illustration of an apparatus for inserting fibers into the tube.

A suitable fiber insertion station, which is shown in FIG. 12, comprises aligned blocks 67, 74, 76, 79, 82 and 83. Rubber surfaced clamps 70 and 71 are capable of retaining optical fibers against block 67. Similar clamps 84 and 85 are associated with block 83. The clamps, which are spring biased against the blocks, can be withdrawn from contact with the blocks by depressing a handle connected thereto. Block 74 contains spaced grooves 72 and 73 that are aligned with grooves 80 and 81 of block 82. A single groove 75 in the surface of block 76 is aligned with similar groove 78 of block 79. The illustrated grooves may be U-shaped and may have a width that is just sufficient to slidingly accommodate the fiber or fibers that are situated therein.

Two lengths 22' and 24' of coated optical fiber are severed from a reel of fiber. An end of each of fibers 22' and 24' is secured by clamps 70 and 71, respectively. The entire lengths of the fibers are wiped with a lintless cloth dampened with a suitable cleaning solution such as ethyl alcohol.

There is selected a capillary tube 10', the aperture of which is preferably just large enough to accept the coated portions of the optical fibers. Such a relationship between the coated fibers and the aperture prevents the ends of the fibers from twisting within the tube. As illustrated in FIG. 11, certain hole cross-sectional shapes such as diamond, square and the like facilitate the proper alignment of the fibers in the tube. The aperture diameter should not be so small that it is difficult to thread the fibers therethrough, since this could cause the coating to smear on the inside of the tube. The smeared region of the tube could cause the resultant coupler to contain seeds that would degrade the coupler's performance. In order to facilitate easy movement of the tube along the fibers, a small amount of ethyl alcohol may be squirted into the tube. This functions as a temporary lubricant which will readily evaporate. The capillary tube is threaded onto the fibers and moved to approximately the position shown adjacent block 76. The fibers are pulled slightly so that they are under some tension and the remaining ends thereof are then restrained by clamps 84 and 85. A mechanical stripping tool is utilized to remove a portion of the coating from each fiber at a location thereon between tube 10' and block 79. The length of the stripped section of fiber is slightly shorter than the length of the capillary tube aperture to allow the coating to extend into both ends of thereof, thereby properly positioning the fibers within the aperture cross-section. The lengths of the stripped regions should be about equal, and those regions should be adjacent one another.

Using a dampened lintless cloth, the two fibers are grasped at the left end of tube 10' and are wiped firmly, the cloth being moved away from the tube and across the stripped regions. This step removes any loose material generated by the coating stripping step and leaves a pristine surface on the stripped regions of the fibers. The fibers are then placed into grooves 75 and 78 which help to hold the fibers straight and adjacent one another. Clamp 84 is released and then reclamped after fiber 22' has been retensioned; fiber 24' is then similarly retensioned.

The capillary tube is moved toward block 79 and positioned such that it is centered over the stripped region as shown in FIG. 10. A small amount 87 of glue is applied to one side of fibers 22' and 24' to attach them to one side of tapered aperture 16' while leaving an opening 88 which permits access to longitudinal aperture 12' between glue 87 and the remainder of the tapered aperture 16'. A drop 89 of glue is similarly applied between the fibers and tapered aperture 14', leaving aperture access opening 90 between glue 89 and tapered aperture 14'. Depending upon the size of the capillary tube aperture, it can be difficult or even impossible to glue the fibers to the tube end portions without blocking the aperture unless the tube is provided with tapered apertures 14' and 16'. Openings 88 and 89 permit the flow of fluid through aperture 12' during the final wash, and also permit the evacuation of aperture 12' during the collapse of tube 10'. If the glue is a UV light curable epoxy, UV light source 86 is directed on the first applied drop of epoxy to cure it before the second drop is applied to the remaining end. After the second drop is applied, source 86 is moved as indicated by the arrows and directed onto the second drop.

The pigtails or sections of fiber extending from the ends of tube 10' can be color coded. At this time the fibers within the capillary tube are visually checked for internal twists. A twist of more than 180° can be seen by the naked eye. Also, a laser beam can be launched into that end of fiber 22' protruding from clamp 84. If there is no twist present, the light emanates from that end of fiber 22' protruding from clamp 70. An orientation mark can be placed on the upper surface of tube 10' so that the fibers can be oriented in the same manner with respect to the draw apparatus for each coupler that is made, thereby ensuring every coupler preform is subjected to uniform process conditions.

Figure 13:
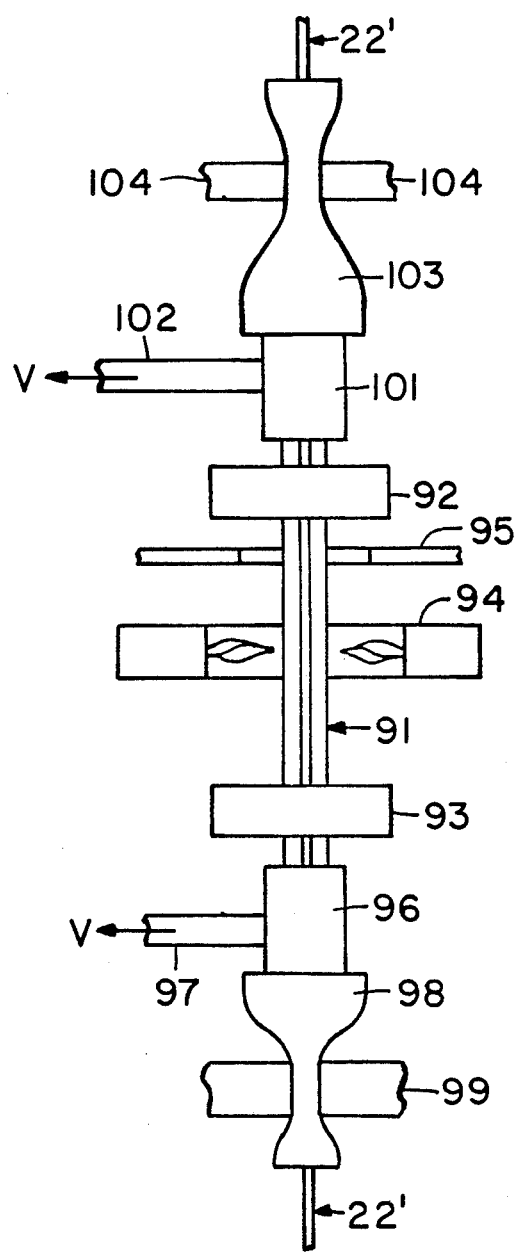
FIG. 13 is a schematic illustration of an apparatus for collapsing the tube and drawing the midregion thereof.

A preferred apparatus for performing the tube collapsing and stretching steps is shown in FIG. 13. Chucks 92 and 93, which are used to secure the coupler preform in this apparatus, are mounted on motor controlled stages, which are preferably controlled by a computer. The numerals 92 and 93 are also used to designate the stages. Symmetry is an important requirement for the collapse and stretch steps; therefore, chucks 92 and 93 must be aligned to prevent the occurrence in the coupler of an offset which can adversely affect device loss and which can also adversely affect coupler bidirectionality, that characteristic whereby coupler output performance is substantially uniform regardless of which end of a fiber is selected as the input port. Coupler bidirectionality is also enhanced by locating the burner centrally along the coupler preform so that it heats the preform evenly. A symmetrically designed burner such as ring burner 94 is suitable for evenly heating the capillary tube midregion. Heat shield 95 protects the apparatus located above the burner.

Coupler preform 91 of FIG. 10 is inserted through ring burner 94 with the orientation mark facing a predetermined direction. The preform is clamped to the draw chucks, and vacuum attachments 96 and 101 are attached to the ends thereof. Vacuum attachment 96, which is shown in cross-section in FIG. 10, may comprise a short, somewhat rigid section of rubber tube having a vacuum line 97 extending radially therefrom. One end of a length of thin rubber tubing 98 is attached to that end of vacuum attachment 96 that is opposite preform 91; the remaining end of the tubing extends between clamp jaws 99. Upper vacuum attachment 101 is similarly associated with line 102, tubing 103 and clamp jaws 104. Fibers 22' and 24' extend from tubing 98 and 103.

Vacuum is applied to the lower portion of coupler preform 91 for a time sufficient to wash aperture 12' by clamping jaws 99 on tubing 98. The upper line is vented to air during this time by leaving clamp jaws 104 open. This "air wash" pulls from aperture 12' any loose debris which has accumulated therein during the fiber insertion step. Jaws 104 are then clamped against tubing 103 to apply vacuum to the upper portion of preform 91.

The capillary tube collapse step entails heating the coupler preform with the flame from ring burner 94 for a short period of time, typically 25 seconds, to increase the temperature of the midregion of the tube to the softening temperature. With the assistance of the differential pressure on the tube, this causes the matrix glass to collapse onto the fibers and urges them into mutual contact. The tube matrix glass surrounds the fibers and fills the aperture to form a solid structure, thereby eliminating airlines in the coupling region. The aperture is preferably evacuated from both ends thereof during the collapse step. The longitudinal length of the region that is to be collapsed is determined by the flame temperature, as determined by the flow of gases to the burner, and the time duration of the flame.

The central portion of the collapsed midregion of the tube can be stretched without removing the device from the apparatus in which the tube was collapsed. After the tube cools, the flame is reignited, and the center of the collapsed region is reheated. The flame duration for the stretch process, which depends upon the desired coupler characteristics, is usually between 10 and 20 seconds. The shorter heating period for the stretch step results in a stretched region that is shorter than the collapsed region. After the collapsed tube is reheated, stages 92 and 93 pull in opposite directions until the coupler length has been increased by a predetermined amount. If properly aligned apparatus is employed and if the process parameters are carefully controlled, all couplers formed by the process will possess similar optical characteristics.

The amount of stretching to which the capillary tube must be subjected to achieve a given type of coupler is initially determined by injecting light energy into one input fiber of a collapsed coupler preform and monitoring operation. To accomplish this purpose, one of the fiber pigtails is aligned with a light source, and both pigtails at the other end of the device are coupled to light detectors. The predetermined ratio of the dynamic output powers can be used as an interrupt to cause stages 92 and 93 to stop pulling the sample. After having determined the proper stretching distance to achieve predetermined coupling characteristics, the apparatus can be programmed to move the stages that proper stretching distance during the fabrication of subsequent couplers that are to have said predetermined characteristics.

It is conventional practice to monitor output signals to control process steps in the manufacture of optical devices as evidenced by U.S. Pat. Nos. 4,392,712 and 4,726,643, U.K. patent application No. GB 2,183,866 A and International Publication No. WO 84/04822. Furthermore, computers are often employed to in feedback systems which automatically perform such monitor and control functions. A suitably programmed PDP 11-73 micro-computer can be utilized to perform these functions. The timing sequences that have been used in the fabrication of a particular type of coupler can be entered in a separate multiple command file that the computer recalls at run-time. The collapse and stretch steps that are required to make that particular coupler can be executed in succession by the computer on each coupler preform to reproducibly manufacture couplers. The process parameters that can be controlled by the computer to ensure coupler reproducibility are heating times and temperatures, flow rates of gases, and the rate at which the stages pull and stretch the coupler preform. Reproducibility is also a function of the resolution of stages 92 and 93.

After the coupler has cooled, the vacuum lines are removed from the coupler and a drop of glue is applied to each end of the capillary tube where it flows at least partially into the longitudinal aperture. This produces a hermetic seal and also increases the pull strength of the devices. The coupler is then removed from the draw and is ready to be packaged.

Although the foregoing description has been related to couplers made from pairs of optical fibers, it will be evident that the invention is also applicable to couplers made from more than two fibers.

The following specific examples utilize glass capillary tubes formed in the manner described in my co-pending application Ser. No. 082,679, filed Aug. 7, 1987, now U.S. Pat. No. 4,750,926. Glass particulate material was applied to a cylindrical mandrel, consolidated, drawn, and dried in accordance with the teachings of U.S. Pat. Nos. Re. 28,029, 3,884,550, 4,125,388 and 4,286,978, all of which are hereby expressly incorporated herein by reference. More specifically, the particulate material was deposited on a mandrel to form a porous, cylindrically-shaped preform. The mandrel was removed and the porous preform was consolidated to form a tubular glass body which was heated and redrawn to an outside diameter of about 2.8 to 3 mm. One end of the resultant capillary tube was attached to a source of air pressure, and while the tube was rotated, a flame was directed onto the tube at spaced intervals. The air pressure within the tube caused a bubble to be formed at each region of the tube softened by the flame. The tube was scored at the center of each bubble and then severed at each score line to produce a capillary tube having tapered apertures at each end thereof. My copending patent application Ser. No. 082,679 filed Aug. 7, 1987 teaches a method of producing apertures of non-circular cross-section by shrinking the tube onto a carbon mandrel of desired cross-section and then burning out the mandrel; this application is incorporated herein by reference.

EXAMPLE 1

Reference will be made to FIGS. 1-7 during the description of this example. Capillary tube 10 was formed as described above; it had an outside diameter of about 2.8 mm, a longitudinal aperture diameter of 400 $\mu$m, and had a length of 5.1 cm. Tube 10 was formed of a borosilicate glass containing 8 wt % B 0. Two single-mode optical fibers having an outside diameter of 125 $\mu$m were each cut to a length of approximately 2 m. Each fiber comprised a core, a cladding and a urethane acrylate resin coating. A commercially available mechanical stripper was used to remove the resin coating from approximately 3.8 cm (1½ inches) of the central portion of each fiber.

The uncoated portions of the fibers were wiped with a lintless cloth to remove residual matter, and the fibers were pulled through longitudinal aperture 12 until the uncoated portions of the fibers were approximately centered therein. A hollow glass fiber 28 having an outside diameter of approximately 125 μm was inserted approximately 0.3 to 0.6 cm (⅛ to ¼ inch) into end 20 of the tube. A quantity of Norland UV curable glue was disposed within tapered aperture 16 about the three fibers and cured by exposure to UV light for about 1 minute. In this manner the optical fibers and filament 28 were rigidly affixed to the end of tube 10.

The two optical fibers were then twisted 180° within aperture 12, and a second hollow fiber 26 was inserted approximately 0.3 to 0.6 cm into the other end of longitudinal aperture 12. A slight tension was applied to the two fibers and a drop of UV curable glue was applied to the fibers within tapered aperture 14. The glue was cured as described above. The assembly so formed was mounted in a tinner's clamp that was modified by cutting away the central portion and one end portion of the clamping region such that when the coupler assembly was mounted, midregion 38 and one end surface 18 was exposed. A tube connected to a vacuum source was connected to one end of the capillary tube such that the optical fibers and hollow filament were disposed inside the evacuated tube. In this manner, longitudinal aperture 12 was evacuated through hollow filament 28. Hollow fiber 26 was inserted into a beaker of 30% ammonia solution. The ammonia solution was sucked into aperture 12 whereby the aperture and the outside surfaces of the optical fibers were cleansed for approximately 10 seconds. Hollow fiber 26 was then removed from the beaker of cleansing solution. After as much of the liquid as possible was removed from aperture 12 by the vacuum source, a burner was directed at tube 10 for about 20 seconds to assist in drying out the interior thereof.

The midregion 38 of tube 10 was then heated to the softening point of the borosilicate glass by an oxygen-hydrogen burner whereupon the glass collapsed around the optical fibers within the longitudinal aperture. The flame was then traversed through the midregion in the direction of the vacuum source so that as the material of the tube collapsed about the optical fibers; residual matter within the longitudinal aperture being sucked out by the vacuum. In this manner a solid midregion was formed free of air lines or bubbles.

The assembly so formed was then removed from the modified tinner's clamp and placed in a precision glass working lathe. The lathe was a Heathway glass working lathe having a computer controlled pull down or drawn down mechanism. The flame from an oxygen-hydrogen gas burner was then applied to a small portion of the solid midregion until the softening point of the materials was reached, whereupon the computer controlled pull down apparatus stretched the heated section for an interval of approximately 0.5 second. The diameter of the pulled down section was approximately 0.7 mm.

Thereafter, hollow filaments 26 and 28 were broken off, and UV curable glue was applied to the ends of the device to cover the resultant holes. The assembly was then packaged within a stainless steel tube for stiffness. Signal losses measured on the coupler so formed were typically in the 0.05 to 0.7 dB range at 1300 μm wavelength. This produced a 50:50 signal split in the fibers having a 1200 μm cutoff wavelength.

EXAMPLE 2

There was provided a capillary tube 10 of the type described in Example 1. Two single-mode optical fibers of the type described in Example 1 were prepared in accordance with that example. After the uncoated portions of the fibers were wiped, they were pulled through longitudinal aperture 12 and the uncoated portions were approximately centered therein. A quantity of Norland UV curable glue was carefully placed between the fibers and one side of tapered aperture 16, leaving a small opening to aperture 12. The glue was cured by exposure to UV light for about 1 minute. In this manner the optical fibers were rigidly affixed to the end of tube 10. After a slight tension was applied to the two fibers, a drop of UV curable glue was carefully applied and cured, as described above, to rigidly adhere the fibers to tapered aperture 14.

The assembly so formed was placed in the precision glass working lathe of Example 1. The flame from an oxygen-hydrogen gas burner was then applied to a small portion of the midregion until the softening point of the materials was reached, whereupon the computer controlled pull down apparatus stretched the heated section for an interval of approximately 0.6 second. The amount of elongation of the capillary tube was about 4 cm, about twice the amount of tube elongation needed in Example 1. The diameter of the drawn down section was approximately 0.4 mm. UV curable glue was applied to the ends of the device to close the openings to the aperture.

Devices formed by this method functioned as 3 dB couplers, that is, it produced a 50:50 signal split. Signal losses measured on these devices were as low as 0.05 dB 1300 μm.

EXAMPLE 3

Employing the apparatus of FIGS. 12 and 13, the following steps performed in order to fabricate a single-mode 3 dB coupler. Reference will also be made to the coupler preform of FIGS. 10 and 11. Two lengths 22' and 24' of coated single-mode optical fiber were severed from a reel of fiber. The optical fibers had a diameter of 125 μm, and the diameter of the coated fiber was 160 μm. The length of each piece of fiber was about 2 meters. The ends of the fibers were secured by clamps 70 and 71, and the fibers were wiped with a lintless cloth dampened with ethyl alcohol.

Capillary tube 10' had an outside diameter of about 2.8 mm and a length of about 4.12 cm. The longitudinal aperture was diamond-shaped, each side of the diamond having a length of about 310 μm. Tube 10' was formed of a borosilicate glass containing 8 wt % $B_2O_3$. The minimum cross-sectional dimension of the diamond-shaped aperture was just large enough to accept the coated portions of the optical fibers in the manner illustrated in FIG. 11. A small amount of ethyl alcohol was squirted into the capillary tube which was then threaded onto the fibers and moved to approximately the position shown in FIG. 12. The fibers were pulled slightly and the remaining ends thereof were clamped. A section of coating about 3.2 cm (1.25 inch) long was removed from each fiber at a location thereon between tube 77 and block 79. The length of the stripped section of fiber was slightly shorter than the length of the capillary tube aperture. The two fibers were again wiped with a lintless cloth that had been dampened with ethyl alcohol to remove loose material generated by the coating stripping step. The fibers were placed into grooves 75 and 78; they were then retensioned and restrained by clamps 84 and 85.

Tube 10' was centered over the stripped region as shown in FIG. 10, and the fibers were tacked to the ends of the tube as described above using Dymax 911 UV curable adhesive. A small amount 87 of the adhesive was carefully applied to one side of fibers 22' and 24' at each end of the tube to ensure the presence of openings 88 and 90. The adhesive was exposed to a Dymax PC-3 UV light source for thirty seconds at each end of the tube. The fiber pigtails extending from the coupler preform were color coded. At this time the fibers within the capillary tube were visually checked for twists. Also, a beam of HeNe laser light was launched into that end of fiber 22' protruding from clamp 84. The radiation of light from the remaining end of that fiber indicated that no partial twist was present. An orientation mark was placed on the upper surface of tube 10'.

Coupler preform 91 was inserted through ring burner 94. With the orientation mark facing the operator, the ends of the preform were secured in chucks 92 and 93. Vacuum attachments 96 and 101 were attached to the preform ends as shown in FIG. 13. Jaws 99 were clamped on tubing 98 to apply a vacuum to the lower portion of coupler preform 91 while the upper end of the preform was vented. This "air wash" was continued for approximately thirty seconds. Jaws 104 were then clamped against tubing 103 to apply to the upper portion of preform 91 a vacuum that was allowed to stabilize at approximately 53 cm (21 inches) of Hg.

The ring burner was turned on for about 25 seconds to increase the temperature of the midregion of the tube to the softening temperature of the borosilicate glass. This caused tube to collapse onto the fibers along a section of the tube about 0.6 cm long. After the coupler preform cooled for about 30 seconds, the flame was reignited, and the collapsed region was reheated for about 16 seconds. Stages 92 and 93 moved in opposite directions to increase the coupler length by about 1.1 cm. All of the process steps performed in the tube collapse step and the stretch step were performed under the control of a PDP 11-73 micro-computer.

After the coupler had cooled, the vacuum lines were removed from the coupler, and a drop of Dymax 304 adhesive was applied to each end of the capillary tube and was exposed to UV light for 30 seconds. The coupler was then removed from the draw.

This process typically produced 3 dB couplers that operated at a predetermined wavelength such as 1300 nm. Median excess device loss was about 0.3 dB, and the lowest measured loss was 0.01 dB.

I claim:

1. A method of making a fiber optic coupler comprising the steps of:
    providing a glass tube having first and second opposite end portions and a midregion, a longitudinal aperture extending from a first end of said tube to a second end thereof,
    disposing at least two glass optical fibers, each having a core and cladding, within said longitudinal aperture, said fibers extending beyond each of said ends of said tube,
    creating a differential pressure across the wall of said tube whereby the pressure within said aperture is lower than that immediately adjacent the outer surface of said tube,
    heating said tube midregion, the combined effect of said pressure differential and said heating causing said midregion to collapse onto said fibers, and
    drawing the central portion of said midregion to reduce the diameter thereof and to reduce the distance between the cores of said fibers so that optical signals can be coupled from one of said cores to another of said cores, whereby a drawn down portion is formed.

2. The method of claim 1 wherein the step of creating comprises evacuating said aperture prior to the step of heating said tube to collapse the central portion thereof.

3. The method of claim 2 wherein said two glass fibers have a coating thereon, said method further comprising the step of removing a portion said coating intermediate the ends thereof and disposing the uncoated portion of said glass fibers within said longitudinal aperture of said tube.

4. The method of claim 3 further comprising the step of cleansing the uncoated portion of said optical fibers prior to disposing them within said longitudinal aperture.

5. The method of claim 4 wherein the range of ratios of the diameter of said drawn portion of said midregion to the starting diameter of said tube is between approximately ½ and 1/20.

6. The method of claim 5 further comprising the step of applying glue to said first and second ends of said tube, to hermetically seal any uncollapsed portions of said aperture.

7. The method of claim 6 wherein the step of providing a glass tube comprises providing a tube having enlarged tapered apertures in said end portions for providing access to said longitudinal aperture from the ends of said tube, said tapered apertures facilitating the gluing of said fibers to said end portions without eliminating access to said longitudinal aperture.

8. The method of claim 2 wherein the step of heating comprises heating the central portion of said tube to at least the softening point of the material thereof, to collapse the central portion of said tube around said fibers, thereby forming a solid midregion, and thereafter heating at least a portion of said solid midregion to at least the softening points of the materials of said glass fibers and said tube and drawing at least a portion of said midregion.

9. The method of claim 8 where the step of disposing comprises affixing each of said fibers to said first end portion of said tube, pulling that portion of said fibers that extend from said aperture at said second end of said tube to apply a tension to said fibers, and affixing each of said fibers to said second end portion of said tube.

10. The method of claim 9 wherein the step of affixing said fibers to the end portions of said tube comprises applying glue to said fibers to seal said fibers to said first end portion of said member and applying glue to said fibers to seal them to said second end portion of said member, the step of applying glue to at least one of the end portions of said tube comprising applying glue to less than the entire circumferential region around said fibers, thereby leaving an opening between said aperture and said glue, whereby there is retained an access to said aperture at that end of said tube.

11. The method of claim 1 wherein said at least two glass fibers have a coating thereon, said method further comprising the step of removing a portion said coating from a portion of each of said fibers, disposing the uncoated portion of each of said glass fibers within said longitudinal aperture of said tube, cleansing the uncoated portion of said optical fibers prior to disposing them within said longitudinal aperture, and, after the step of drawing, applying to the ends of said tube a sufficient amount of glue that some glue enters said aperture and contacts the stripped portions of said fibers.

12. The method of claim 1 wherein the step of disposing comprises inserting said fibers into said tube and holding said fibers taut to effect a tension therein.

13. The method of claim 1 wherein the step of drawing comprises pulling at least one of said ends of said tube in a direction away from the other end thereof.

14. The method of claim 1 wherein the step of drawing comprises allowing said tube to cool, reheating the central portion of said midregion, and stretching said central portion.

15. The method of claim 14 wherein said reheating step is of shorter time duration than said heating step.

16. The method of claim 14 wherein the maximum temperature to which said tube is heated during said reheating step is less than the temperature to which said tube is heated during said heating step.

* * * * *